United States Patent [19]

Hedtmann-Rein et al.

[11] Patent Number: 5,036,146
[45] Date of Patent: Jul. 30, 1991

[54] HIGH TEMPERATURE RESISTANT POLYSULFONE-POLYIMIDE BLOCK COPOLYCONDENSATES AND PREPARATION THEREOF BY MELT CONDENSATION

[75] Inventors: Carola Hedtmann-Rein, Hirschberg; Gerhard Heinz, Weisenheim, both of Fed. Rep. of Germany

[73] Assignee: BASF Aktiengesellschaft, Ludwigshafen, Fed. Rep. of Germany

[21] Appl. No.: 451,233

[22] Filed: Dec. 15, 1989

[30] Foreign Application Priority Data

Jan. 12, 1989 [DE] Fed. Rep. of Germany ....... 3900675

[51] Int. Cl.$^5$ .............................. C08G 75/23
[52] U.S. Cl. ........................ 525/436; 525/534; 525/535; 525/906
[58] Field of Search .............. 525/436, 534, 535, 906

[56] References Cited

U.S. PATENT DOCUMENTS 3,663,507  5/1972  Nogel et al. ............... 525/436
4,175,175 11/1979  Johnson et al. .
4,540,748  9/1985  Matzner et al. .

FOREIGN PATENT DOCUMENTS 0030033  6/1981  European Pat. Off. .
0161453 11/1985  European Pat. Off. .

OTHER PUBLICATIONS

Synthesis of Polymide-Poly(Arylene Ether Sulfone)-Copolymers, Polymer Preprints, 25 (1984), pp. 49–51, Bruce C. Johnson, et al.
J. Chem. Soc. (1961), 1604–1610, J. H. Golden, Poly-p-xylylene and Related Polymers.
J. Polymer Sci., 40 (1961), pp. 399–406, William M. Eareckson III, Interfacial Polycondensation. X. Polyphenyl Esters.

*Primary Examiner*—John C. Bleutge
*Assistant Examiner*—David W. Woodward
*Attorney, Agent, or Firm*—Oblon, Spivak, McClelland, Maier & Neustadt

[57] ABSTRACT

High temperature resistant polysulfone-polyimide block copolycondensates suitable for example for producing shaped articles are composed of at least one polyarylene ether sulfone block comprising units of the structure

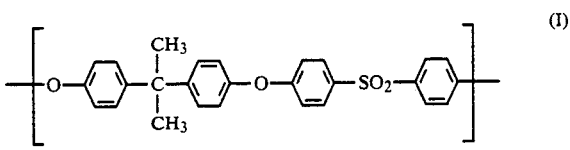

and/or

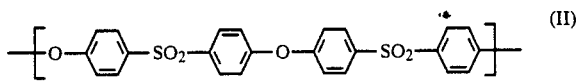

and at least one polyimide block comprising units of the structure

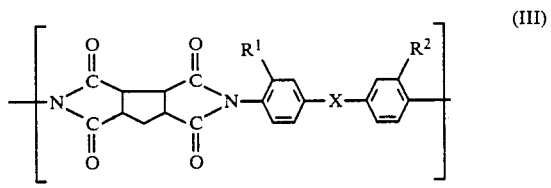

and/or

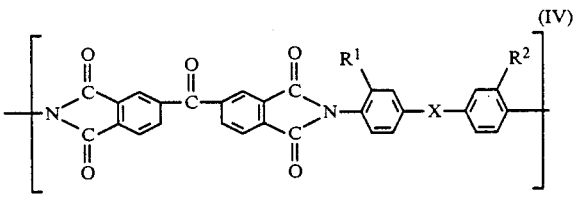

where $R^1$ and $R^2$ are identical or different and each is hydrogen or methyl and X is methylene or 1,2-ethylene, and are prepared by condensing conventionally obtained amine-terminated polyarylene ether sulfone blocks with polyimide blocks in the melt.

8 Claims, No Drawings

HIGH TEMPERATURE RESISTANT POLYSULFONE-POLYIMIDE BLOCK COPOLYCONDENSATES AND PREPARATION THEREOF BY MELT CONDENSATION

The present invention relates to high temperature resistant polysulfone-polyimide block copolycondensates formed from selected polyarylene ether sulfone blocks and specific polyimide blocks and prepared by polycondensation of the polyimide blocks in the melt.

Polycondensation products containing aromatically bonded sulfone groups are known from literature and patent publications. See for example J. Chem. Soc. 1961, 1604–1610; J. Polym. Sci. 40 (1959), 399–406; and DE-B-1,545,106 (U.S. Pat. No. 4,175,175).

Polyarylene ether sulfones have good mechanical properties, for example toughness and heat aging resistance, and also good electrical properties.

Random ether sulfone/ether ketone copolymers composed of repeat units

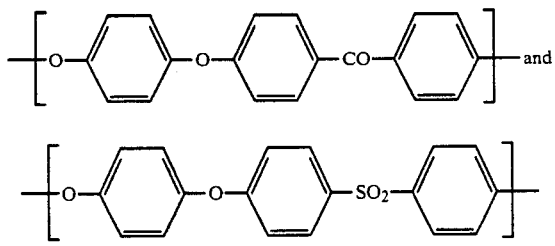

are described for example in EP-A-1879 These polycondensates are obtainable by simultaneous condensation of hydroquinone, 4,4'-dichlorobenzophenone and 4,4'-dichlorodiphenyl sulfone.

Furthermore, arylene ether ketone polycondensates containing bridge members such as —CO—, —SO—, —S—, —SO$_2$—, —O—, alkylene, cycloalkylene, arylene, alkylidene or cycloalkylidene of from 2 to 20 carbon atoms are known, for example from EP-A-030,033 or EP-A-161,453.

Polyimides are also known A comprehensive review of their preparation, properties and use is given for example in the monograph, Polyimides, Volumes 1 and 2, edited by K. L. Mittal and published by Plenum Press, New York and London, 1971, and in Chemical Process Review No. 54, Polyimide Manufacture, 1971, by Dr. M. W. Ranney, Noyes Data Corporation, New Jersey. The preparation of polyimide/polyarylene ether/sulfone copolymers in aprotic solvents by reaction of 2 moles of p-aminophenol with 1 mole of 3,3',4,4'-benzophenonetetracarboxylic dianhydride to give bisphenolbenzophenonediamidodicarboxylic acid, the dehydration of the latter to bisphenolbenzophenone diimide, and the polycondensation of the latter with 4,4'-dichlorodiphenyl sulfone is described in Polymer Preprints 25 (1984), 49-51.

U.S. Pat. No. 4,540,748 describes amine-terminated polyphenylene ether sulfones and the polycondensation thereof with aromatic tetracarboxylic dianhydrides to give polyether imides.

Yet the cited references do not mention polysulfone-polyimide block copolycondensates.

To prepare polyarylene ether sulfones, the aromatic dichloro and dihydroxy compounds are polycondensed in polar aprotic solvents in the presence of alkali metal carbonates and the products are then isolated by separating off the solvent or by precipitating with nonsolvents.

Polyimides are likewise polycondensed in polar aprotic solvents To this end, polyamidocarboxylic acids are prepared in a first reaction stage from aromatic tetracarboxylic dianhydrides and aromatic diamines and then dehydrated in a second reaction stage, usually in the presence of carboxylic anhydrides and tertiary amines as catalyst.

It is an object of the present invention to improve the solvent and stress crack resistance of polyarylene ether sulfones and also their mechanical stability under a sustained load at elevated temperature. In addition, the polycondensates should be inexpensive to produce by an industrially practicable process.

We have found, surprisingly, that these objects are achieved by block copolycondensates containing not only selected polyphenylene ether sulfone blocks having certain molecular weights but also selected polyimide blocks having certain molecular weights in certain limited mixing ratios. The selection of specific monomers makes it possible to condense polyimide blocks in the melt onto conventionally prepared polyphenylene ether sulfone blocks having terminal amino groups. Compared with copolycondensation in solution, the melt condensation according to the present invention permits the considerable shortening of the reaction time, for example from 19 hours down to 15 minutes, and thereby considerably increases the space-time yield. The thermal cyclization of the polyamidocarboxylic acid intermediates to polyimides eliminates the need not only for the dehydrating treatment of the polyamidocarboxylic acids with carboxylic anhydrides in solution but also for the subsequent isolation of the polysulfone-polyimide block copolycondensates by precipitation with nonsolvents, filtration, washing and drying under reduced pressure. The incorporation of polyimide blocks into polyarylene ether sulfone block polycondensates reduces not only their solubility but also their stress crack susceptibility. The polyimide blocks also raise the glass transition temperature of the block copolycondensates, thereby distinctly improving the stability of the mechanical properties under a sustained load within the range from 160° to 180° C.

The present invention accordingly provides a high temperature resistant polysulfone-polyimide block copolycondensate containing or preferably consisting of (A) from 70 to 98 mol %, preferably from 80 to 95 mol %, in particular from 85 to 95 mol %, based on the total amount of (A) and (B), of polyarylene ether sulfone blocks having a number average molecular weight Mn within the range from 1,500 to 20,000 and composed of units of the formulae

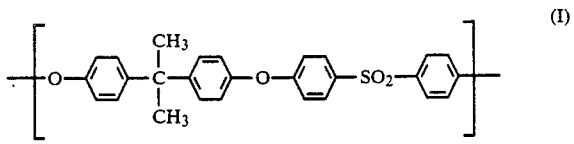

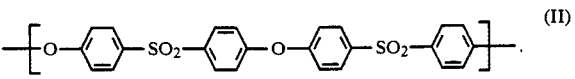

or of mixtures of units of the formulae (I) and (II), bonded in random distribution or in the form of blocks, and (B) from 2 to 30 mol %, preferably from 5 to 20 mol %, in particular from 5 to 15 mol %, based on the total amount of (A) and (B), of polyimide blocks having a number average molecular weight Mn of from around 400 to 5,000 and composed of units of the formulae

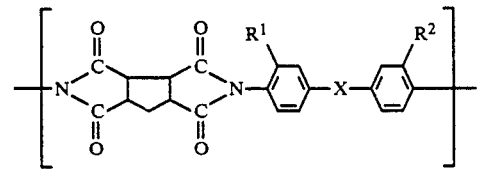

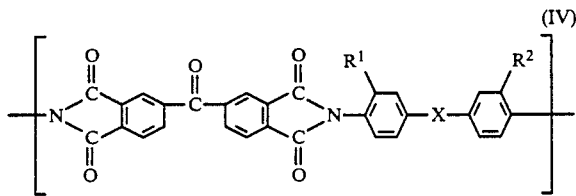

or of mixtures of units of the formulae (III) and (IV), where $R^1$ and $R^2$ are identical or different and each is methyl or preferably hydrogen and X is a bridge member from the group consisting of —CH$_2$CH$_2$— and preferably —CH$_2$—
and prepared by melt condensation.

The present invention also provides a process for preparing a high temperature resistant polysulfonepolyimide block copolycondensate, which comprises (a) reacting in a first stage 4,4'-dichlorodiphenyl sulfone with 4,4'-dihydroxydiphenyl sulfone, 2,2-(4,4'-dihydroxyphenyl)propane or a mixture of 4,4'-dihydroxydiphenyl sulfone and 2,2-(4,4'-dihydroxydiphenyl)propane and p-aminophenol, 2,2-(4-amino-4'-hydroxydiphenyl)propane or a mixture of p-aminophenol and 2,2-(4-amino-4'-hydroxyiiphenyl)propane in a polar aprotic solvent in the presence of an alkali metal carbonate to prepare a polyarylene ether sulfone block copolycondensate (A) having terminal amino groups, and (b) condensing this amine-terminated polyarylene ether sulfone block copolycondensate in the melt with polyimide blocks (B) by reaction with cyclopentanetetracarboxylic dianhydride, 3,3',4,4'-benzophenonetetracarboxylic dianhydride or a mixture of cyclopentanetetracarboxylic dianhydride and 3,3',4,4'-benzophenonetetracarboxylic dianhydride and at least one aromatic diamine selected from the group consisting of 3,3'-dimethyl-4,4'-diaminodiphenylmethane, 3-methyl-4,4'-diamino-diphenylmethane, 1,2-(3-methyl-4,4'-diaminodiphenyl)ethane, 1,2-(3,3'-dimethyl-4,4'-diaminodiphenyl)ethane, 1,2-(4,4'-diaminodiphenyl)ethane and preferably 4,4'diaminodiphenylmethane or of a mixture of at least two of said aromatic diamines at from 300° to 350° C., the monomers being used in such amounts that the resulting polyarylene ether sulfone blocks (A) and polyimide blocks (B) are formed in a ratio of the mole percentages of from 98:2 to 70:30.

The present invention further provides shaped articles containing or consisting of a high temperature resistant polysulfone-polyimide block copolycondensate as claimed in any one of claims 1 to 5.

Component (A) of the polysulfone-polyimide block copolycondensates according to the present invention comprises, as mentioned, polyarylene ether sulfone blocks of units of the formulae (I) or (II)

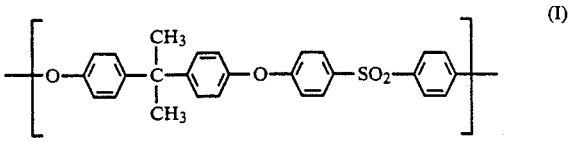

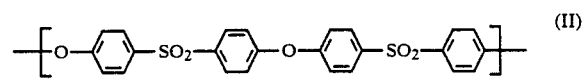

It is also possible to use polyarylene ether sulfone blocks which consist of mixtures of the units of the formulae (I) and (II) and contain these units in random distribution or in the form of blocks The number average molecular weight $M_n$ of the polyarylene ether sulfone blocks (A) is within the range from 1,500 to 20,000, preferably from 3,000 to 19,000, in particular from 5,000 to 18,000.

Component (B) of the high temperature resistant polysulfone-polyimide block copolycondensates according to the present invention comprises, again as mentioned, polyimide blocks composed of units of the formulae

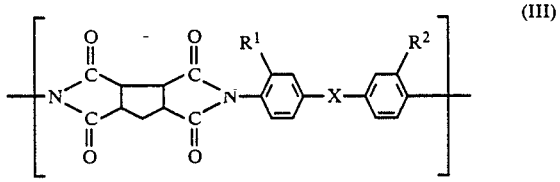

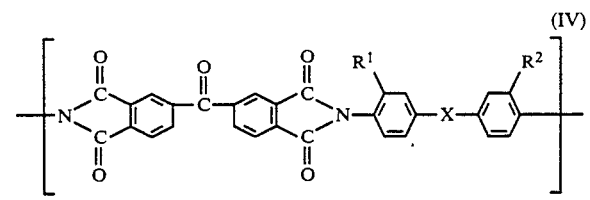

or mixtures of units of the formulae (III) or (IV), wherein the units can be arranged in random distribution or in block form and $R^1$, $R^2$ and X are each as defined above.

Examples of units of the formulae (III) and (IV) of the polyimide blocks are

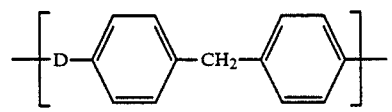

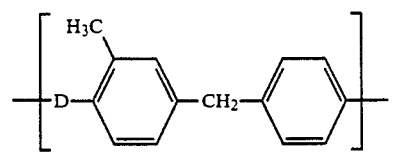

-continued
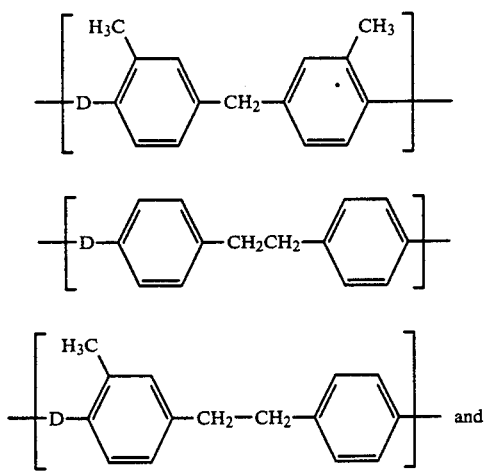
where D is
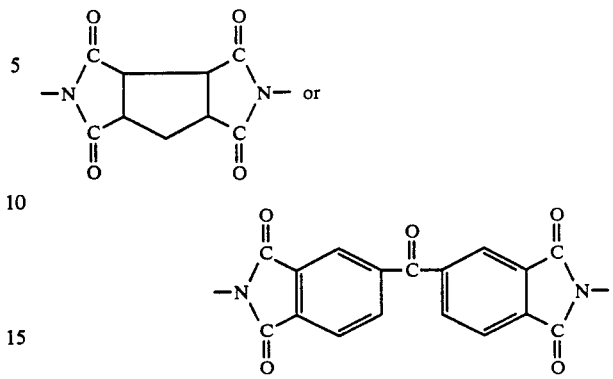
Preference is given to units of the formulae
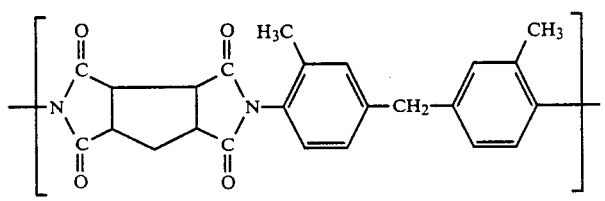
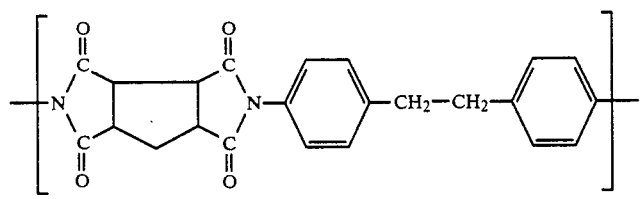
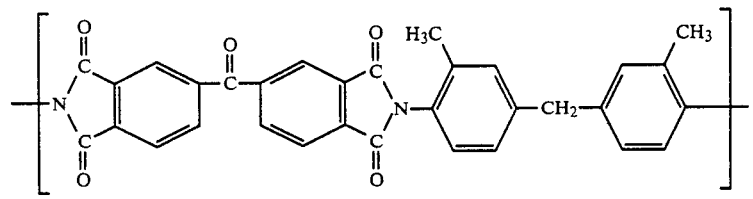
and
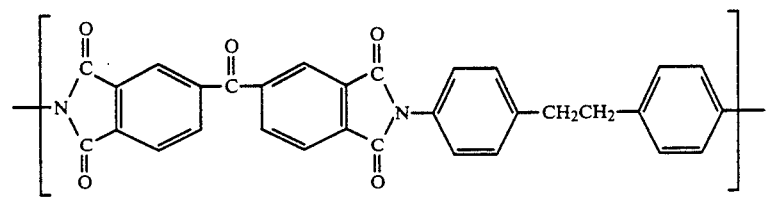
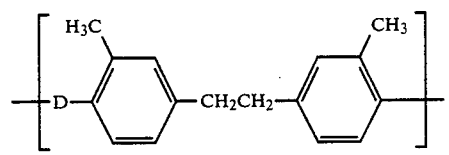
and in particular to units of the formulae

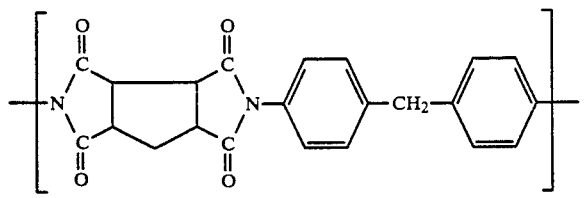

and/or

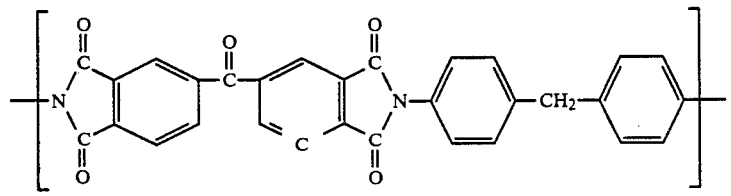

or mixtures of at least two units of the formulae (III1) to (III3) and (IV1) to (IV3), in particular mixtures of units of the formulae (III1) and (IV1).

The number average molecular weight Mn of the polyamide blocks (b) is within the range from 400 to 5,000, preferably from 800 to 4,500 and in particular from 1,000 to 4,000.

The high temperature resistant polysulfone-polyimide block copolycondensates according to the present invention can be prepared continuously or batchwise in a two-stage reaction. Basically, the polyarylene ether sulfone blocks (A), in particular those having terminal amino groups, and the polyimide blocks, in particular those having terminal anhydride groups, can be separately prepared and subsequently joined together by art recognized methods, or the block copolycondensates are synthesized directly by appropriate successive addition of the monomers.

In the preferred two-stage preparation, aromatic dihalogen compounds, aromatic dihydroxy compounds and aromatic aminohydroxy compounds are polycondensed in polar aprotic solvents in the presence of alkali metal carbonates in such a way that (a) a first reaction stage comprises a reaction of monomers of the formulae

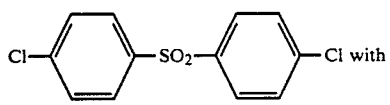

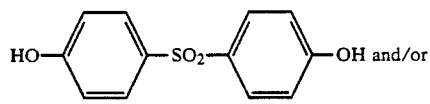

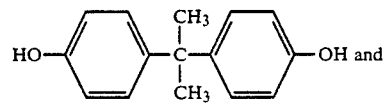

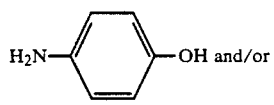

-continued

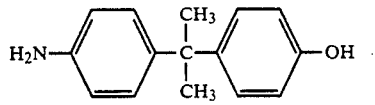

to prepare polyarylene ether sulfone block copolycondensates (A) with terminal amino groups. To this end, the monomers are used in such amounts that the molar ratio of 4,4'-dihydroxydiphenyl sulfone and/or 2,2-(4,4'-dihydroxydiphenyl)propane:paraaminophenol and/or 2,2-(4-amino-4'-hydroxydiphenyl)propane is from 5:2 to 90:2, preferably from 50:2 to 75:2, and the ratio of chlorine atoms of 4,4'-dichlorodiphenyl sulfone:hydroxyl groups of the dihydroxy compounds and of p-aminophenol and/or 2,2-(4-amino-4'-hydroxydiphenyl)propane is within the range from 0.95:1 to 1.05:1, preferably 1:1.

The resulting polyphenylene ether sulfone block polycondensates having terminal amino groups are reacted in a second reaction stage in the melt with cis,cis,-cis,-cis-cyclopentanetetracarboxylic dianhydride, 3,3',4,4'-benzophenonetetracarboxylic dianhydride or mixtures of said dianhydrides and aromatic diamines selected from the group consisting of 3-methyl- or 3,3'-dimethyl-4,4'-diaminodiphenylmethane, 1,2-(3-methyl- or 3,3'-dimethyl-4,4'-diaminodiphenyl)ethane, 1,2-(4,4'-diaminodiphenyl)ethane and preferably 4,4'-diaminodiphenylmethane or of mixtures of at least two of the aromatic diamines mentioned to form cocondensed polyimide blocks. The molar ratio of amine-terminated polyphenylene ether sulfone block polycondensates:aromatic diamines is from 1:1 to 1:15, preferably from 1:2 to 1:10. Depending on the molecular weight desired for the polyimide blocks, the cyclopentane- and/or 3,3',4,4'-benzophenone-tetracarboxylic dianhydride and the aromatic diamines and amine-terminated polyarylene ether sulfone block polycondensates are used in such amounts that the ratio of anhydride to amino groups is within the range from 0.95:1 to 1.05:1, preferably 1:1.

To prepare the high temperature resistant polysulfone-polyimide block copolycondensates according to the present invention, the various polyarylene ether sulfone blocks and polyimide blocks can in principle be combined with one another in any desired manner as long as the preconditions of claim 1 are met.

The total molecular weight of the polysulfonepolyimide block copolycondensates is within the range from 15,000 to 200,000, preferably from 15,000 to 100,000, in particular from 20,000 to 50,000.

All the abovementioned molecular weights are number averages as defined for example in E. Vollmert, Grundriß der Makromolekularen Chemie, Volume 3, page 122 et seq. (1979).

The polyarylene ether sulfone blocks, in particular the amine-terminated polyarylene ether sulfone polycondensates, are prepared under the same conditions, such as temperature, pressure, the solvent used and the presence or absence of additives (catalysts), as described for random copolycondensates in EP-A-113,112 and EP-A-135,130 and for amine-terminated copolycondensates in EP-A-107,897 and U.S. Pat. No. 4,540,748, so that no further details need be given here.

It is particularly advantageous to carry out the reaction in an aprotic polar solvent in the presence of an anhydrous alkali metal carbonate as catalyst. A particularly preferred combination is N-methylpyrrolidone as solvent and $K_2CO_3$ as basic catalyst.

The amount of N-methylpyrrolidone is in general from 5 to 100 moles, preferably from 5 to 20 moles, per mole of monomer. This produces a reaction solution solids content within the preferred range of from 5 to 50% by weight, particularly preferably from 10 to 40% by weight.

The water formed in the course of the polycondensation can be removed by means of an azeotrope former, by applying reduced pressure or preferably by introducing a stream of nitrogen and distilling.

Suitable azeotrope formers are all compounds which under atmospheric pressure boil within the range of the reaction temperature and are homogeneously miscible with the reaction mixture without entering into chemical reactions.

The reaction temperature is in general within the range from 130° to 220° C., preferably from 160° to 210° C.; the reaction time is in general from 0.1 to 15 hours.

The amine-terminated polyarylene ether sulfone block polycondensates can be isolated from the solution by evaporating the solvent or by precipitation with a suitable nonsolvent, for example water, an alkanol, etc.

To prepare the polysulfone-polyimide block copolycondensates according to the present invention, the amine-terminated polyarylene ether sulfone blocks, aromatic diamines and aromatic tetracarboxylic dianhydrides are preferably polycondensed in the melt, advantageously in the presence of an inert gas, e.g. a noble gas, carbon monoxide or preferably nitrogen, at from 300° to 350° C., preferably at from 340° to 350° C. The polyamidocarboxylic acid intermediates formed are directly dehydrated to polyimide block polycondensates under the existing reaction conditions. The water of reaction formed is distilled off. The reaction time for the polycondensation of the polyimide blocks is customarily 5–30 minutes, preferably 10–20 minutes In the most convenient and hence preferred method of preparation, the separately prepared amine-terminated polyarylene ether sulfones, aromatic diamines and aromatic tetracarboxylic dianhydrides are mixed in customary mixing apparatus, for example mixers, at from 15° to 80° C., preferably at from 20° to 30° C., and then polycondensed in the melt in an extruder, preferably in a twin-screw extruder having devolatilizing means. The polysulfone-polyimide block copolycondensate melt formed is then extruded, cooled down and granulated. The granules obtained may be stored, modified or used directly for producing, for example, films, coatings or preferably shaped articles.

The products are notable for improved solvent resistance, low stress crack susceptibility and mechanical stability under a sustained load, even at elevated temperature, for example 160° C. or higher.

The polysulfone-polyimide block copolycondensates prepared according to the present invention by melt condensation may be modified with reinforcing fillers, pigments and other auxiliaries and additives.

Suitable reinforcing fillers are for example carbon and preferably glass fibers, the glass fibers being used for example in the form of glass weaves, mats, webs and/or preferably glass filament rovings or chopped glass filament made of low-alkali E-glasses from 5 to 20 μm, preferably 8 to 15 μm, in diameter, the average length following incorporation being from 0.05 to 1 mm, preferably from 0.1 to 0.5 mm. The molding compositions reinforced with glass filament rovings or chopped glass filament contain from 10 to 60% by weight, preferably from 20 to 50% by weight, of the reinforcing agent, based on the total weight, while the impregnated glass weaves, mats and/or webs contain from 10 to 80% by weight, preferably from 30 to 60% by weight, of polysulfone-polyimide block copolycondensates, based on the total weight. Suitable pigments are for example titanium dioxide, cadmium oxide, zinc sulfide, barium sulfate and carbon black. Other possible additives and auxiliaries are for example dyes, lubricants, e.g. graphite, polytetrafluoroethylene or molybdenum disulfide, abrasives, e.g. carborundum, light stabilizers and hydrolysis stabilizers. It is also possible to use wollastonite, calcium carbonate, glass balls, quartz powder and boron nitride or mixtures thereof. The pigments, additives and auxiliaries are customarily used in amounts of from 0.01 to 3% by weight, based on the weight of the polysulfone-polyimide block copolycondensates.

The high temperature resistant polysulfone-polyimide block copolycondensates according to the present invention are preferably used for producing shaped articles consisting partially or advantageously completely of the block copolycondensates.

In the Examples which follow, the reduced viscosity η n spec/c of the amine-terminated polyarylene ether sulfone block polycondensates was determined at 25° C. in 1% strength by weight solution in N-methylpyrrolidone and that of the polysulfone-polyimide block copolycondensates according to the present invention at 60° C. in 0.1% strength by weight solution in pentafluorophenol.

EXAMPLES

Preparation of polyarylene ether sulfone block polycondensates having terminal primary amino groups

EXAMPLE 1

A mixture of 361.82 g (1.26 mol) of 4,4'-dichlorodiphenyl sulfone,
273.96 g (1.2 mol) of 2,2-(4,4'-dihydroxydiphenyl)propane,
13.24 g (0.1212 mol) of p-aminophenol,
248.78 g (1.8 mol) of potassium carbonate and
800 ml of N-methylpyrrolidone as solvent was heated to 195° C. with thorough stirring under nitrogen over about 20 minutes The water of condensation formed was distilled off azeotropically in the form of an N-methylpyrrolidone/water mixture in the course of 45 minutes, and the polycondensation was led to completion at 195° C. in the course of 6 hours.

After the reaction mixture had cooled down to about 23° C., the polysulfone block polycondensate was precipitated with 1:1 w/w water/methanol, washed four times with 3,000 ml of water each time, filtered off and dried under reduced pressure for 12 hours.

The product obtained had a reduced viscosity in N-methylpyrrolidone of 0.26 dl/g and contained 82 5% of amino end groups, based on the number of end groups.

EXAMPLE 2

Example 1 was repeated using the starting materials in the following amounts:
361.82 g (1.26 mol) of 4,4'-dichlorodiphenyl sulfone,
280.64 g (1.23 mol) of 2,2-(4,4'-dihydroxydiphenyl)proprane
6.78 g (0.062 mol) of p-aminophenol,
191.62 g (1.386 mol) of potassium carbonate and
1300 ml of N-methylpyrrolidone.

The resulting polysulfone block polycondensate had a reduced viscosity in N-methylpyrrolidone of 0.38 dl/g and 71% of amino end groups, based on the total number of end groups.

EXAMPLE 3

Example 1 was repeated, except that the following starting materials and amounts were used:
361.82 g (1.26 mol) of 4,4'-dichlorodiphenyl sulfone,
273.96 g (1.20 mol) of 2,2-(4,4'-dihydroxydiphenyl)propane,
27.51 g (0.01212 mol) of 2,2-(4-amino-4'-hydroxydiphenyl)propane,
248.78 g (1.8 mol) of potassium carbonate and
800 ml of N-methylpyrrolidone.

The product obtained had a reduced viscosity in N-methylpyrrolidone of 0.28 dl/g and 84% of amino end groups, based on the total number of end groups.

EXAMPLE 4

Example 1 was repeated using the starting materials in the following amounts:
361.82 g (1,26 mol) of 4,4'-dichlorodiphenyl sulfone,
300.00 g (1.20 mol) of 4,4'-dihydroxydiphenyl sulfone,
13.24 g (0.1212 mol) of p-aminophenol and
248.78 g (1.8 mol) of potassium carbonate and also
800 ml of N-methylpyrrolidone.

The resulting amine-terminated polyarylene ether sulfone block copolycondensate had a reduced viscosity in N-methylpyrrolidone of 0.23 dl/g and 72% of amino end groups, based on the total number of end groups.

EXAMPLE 5

Example 1 was repeated using the following starting materials and amounts:
361.82 g (1,26 mol) of 4,4'-dichlorodiphenyl sulfone,
307.50 g (1.23 mol) of 4,4'-dihydroxydiphenyl sulfone,
14.07 g (0.062 mol) of 2,2-(4-amino-4',-hydroxydiphenyl)propane,
191.62 g (1.386 mol) of potassium carbonate and also
1300 ml of N-methylpyrrolidone.

The resulting amine-terminated polyarylene ether sulfone block copolycondensate had a reduced viscosity in N-methylpyrrolidone of 0.34 dl/g and 69% of amino end groups, based on the total number of end groups.

Preparation of polysulfone-polyimide block copolycondensates according to the present invention.

EXAMPLE 6

A mixture consisting of
37.07 g (0.0016 mol) of a polysulfone having terminal amino groups, prepared as in Example 2,
1.70 g (0.0085 mol) of 4,4'-diaminodiphenylmethane (97% strength by weight) and
2.28 g (0.01016 mol) of cis,cis,cis,cis-cyclopentanetetracarboxylicdianhydride (96% strength by weight)
was heated to 350° C. in a vigorous kneader through which nitrogen was passed. The water of reaction liberated in the course of the polycondensation was distilled off, and the polycondensation was led to completion at 350° C. in the course of 15 minutes.

The polysulfone-polyimide block copolycondensate prepared in this way had a reduced viscosity in pentafluorophenol of 0.58 dl/g and a glass transition temperature Tg of 192° C. (measured by DSC).

EXAMPLE 7

Example 6 was repeated using the starting materials in the following amounts:
33.36 g (0.0015 mol) of a polysulfone having terminal amino groups, prepared as in Example 2,
3.40 g (0.017 mol) of 4,4'-diaminodiphenylmethane (97% strength by weight) and
4.16 g (0.0185 mol) of cis,cis,cis,cis-cyclopentanetetracarboxylic dianhydride (96% strength by weight)

The polysulfone-polyamide block copolycondensate obtained had a reduced viscosity in pentafluorophenol of 0.46 dl/g and a glass transition temperature Tg of 189° C. (measured by DSC).

EXAMPLE 8

Example 6 was repeated using the following starting materials and amounts:
37.07 g (0.0016 mol) of a polysulfone having terminal amino groups, prepared as in Example 2,
1.70 g (0.0085 mol) of 4,4'-diaminodiphenylmethane (97% strength by weight) and
3.41 g (0.01016 mol) of 3,3',4,4'-benzophenonetetracarboxylic dianhydride (96% strength by weight)

The polysulfone-polyimide block copolycondensate obtained had a reduced viscosity in pentafluorophenol of 0.57 dl/g and a glass transition temperature Tg of 198° C. (measured by DSC).

EXAMPLE 9

Example 6 was repeated using the following starting materials and amounts
17.49 g (0.0016 mol) of amine-terminated polysulfone as prepared in Example 1,
1.70 g (0.0085 mol) of 4,4'-diaminodiphenylmethane (97% strength by weight) and
2.38 g (0.0101 mol) of cis,cis,cis,cis-cyclopentanetetracarboxylic dianhydride (96% strength by weight)

The polysulfone-polyimide block copolycondensate obtained had a reduced viscosity in pentafluorophenol of 0.60 dl/g and a glass transition temperature Tg of 195° C. (measured by DSC).

EXAMPLE 10

Example 6 was repeated using the following starting materials and amounts:
16.13 g (0.0015 mol) of amine-terminated polysulfone as prepared in Example 3, 3.60 g (0.017 mol) of 1,2-(4,4'-diaminodiphenyl)ethane (97% strength by weight) and 4.16 g (0.0185 mol) of cis,cis,cis,cis-cyclopentanetetracarboxylic dianhydride (96% strength by weight)

The polysulfone-polyimide block copolycondensate obtained had a reduced viscosity in pentafluorophenol of 0.56 dl/g and a glass transition temperature Tg of 191° C. (measured by DSC).

EXAMPLE 11

Example 6 was repeated using the following starting materials and amounts:

15.75 g (0.0015 mol) of amine-terminated polysulfone as prepared in Example 4, 3.40 g (0.017 mol) of 4,4'-diaminodiphenylmethane (97% strength by weight) and 6.21 g (0.0185 mol) of 3,3',4,4'-benzophenonetetracarboxylic dianhydride (96% strength by weight)

The polysulfone-polyimide block copolycondensate obtained had a reduced viscosity in pentafluorophenol of 0.45 dl/g and a glass transition temperature Tg of 223° C. (measured by DSC).

We claim:

1. A high temperature resistant polysulfone-polyimide block copolycondensate containing, based on the total amount of (A) and (B), (A) from 70 to 98 mol %, of polyarylene ether sulfone blocks having a number average molecular weight Mn within the range from 1,500 to 20,000 and composed of units of the formulae

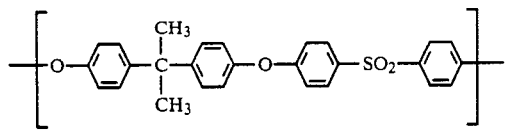

or

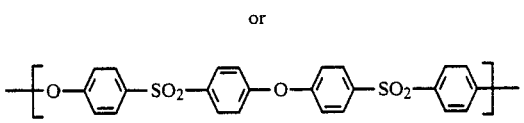

or of mixtures of units of the formulae (I) and (II), bonded in random distribution or in the form of blocks, and (b) from 2 to 30 mole %, of polyimide blocks having a number average molecular weight Mn of from around 400 to 5,000 and composed of units of the formulae

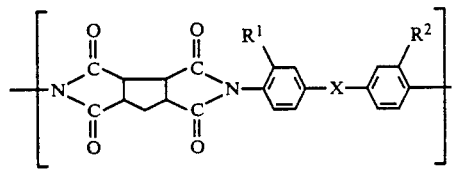

or

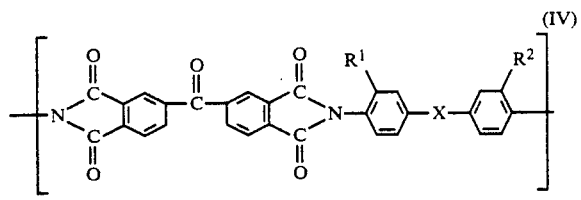

or of mixtures of units of the formulae (III) and (IV), where

R$^1$ and R$^2$ are identical or different and each is hydrogen or methyl and

X is a bridge member selected from the group consisting of —CH$_2$— and —CH$_2$CH$_2$— and prepared by melt condensing amine terminated polyarylene ether sulfone blocks with the aromatic diamine and aromatic tetracarboxylic dianhydride reactants which form the polyimide blocks.

2. A high temperature resistant polysulfone-polyimide block copolycondensate as claimed in claim 1, consisting, based on the total amount of (A) and (B), of (A) from 70 to 98 mol % of polyarylene ether sulfone blocks composed of units of the formulae (I) or (II) or mixtures thereof and (b) from 2 to 30 mol % of polyimide blocks composed of units of the formulae (III) and (IV) or mixtures thereof.

3. A high temperature resistant polysulfone-polyimide block copolycondensate as claimed in claim 1, wherein the polyarylene ether sulfone blocks (A) consist of units of the formula (I).

4. A high temperature resistant polysulfone-polyimide block copolycondensate as claimed in claim 1, wherein the polyimide blocks (B) are composed of at least one of the units of the formulae

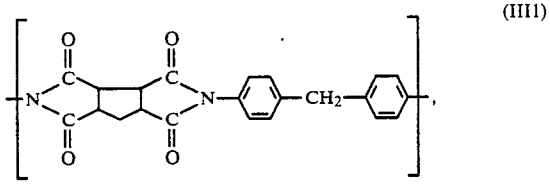

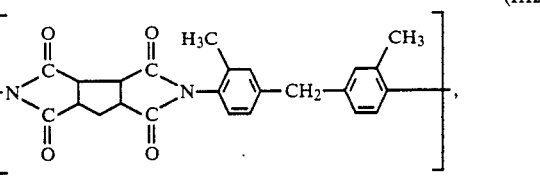

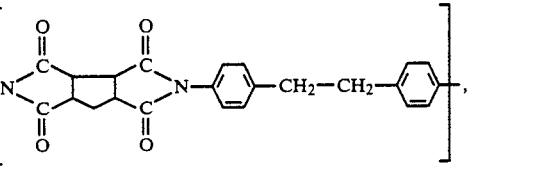

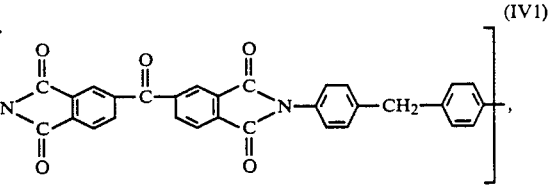

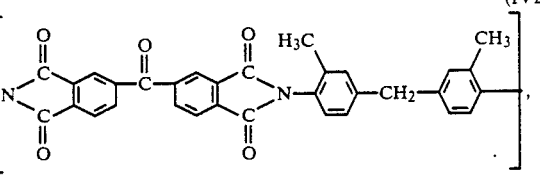

-continued

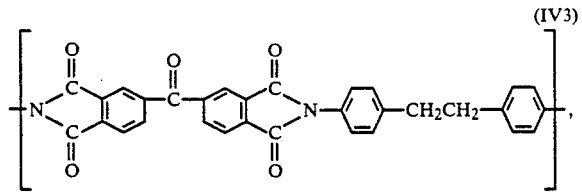
(IV3)

5. A high temperature resistant polysulfone-polyimide block copolycondensate as claimed in claim 4, wherein the polyimide blocks (B) are composed of units of the formulae (III1) or (IV1) or mixture thereof.

6. A high temperature resistant polysulfone-polyimide block copolycondensate as claimed in claim 1, wherein the number average molecular weight of said polyarylene ether sulfone block (A) ranges from 3,000 to 19,000.

7. A high temperature resistant polysulfone-polyimide block copolycondensate as claimed in claim 1, wherein the number average molecular weight of said polyimide blocks (B) ranges from 800 to 4,500.

8. A shaped article containing a high temperature resistant polysulfone-polyimide block copolycondensate as claimed in claim 1.

* * * * *